June 18, 1968  R. NEUSCHOTZ  3,388,621
INSERT INSTALLING AND LOCKING TOOL
Filed Sept. 21, 1965  2 Sheets-Sheet 2
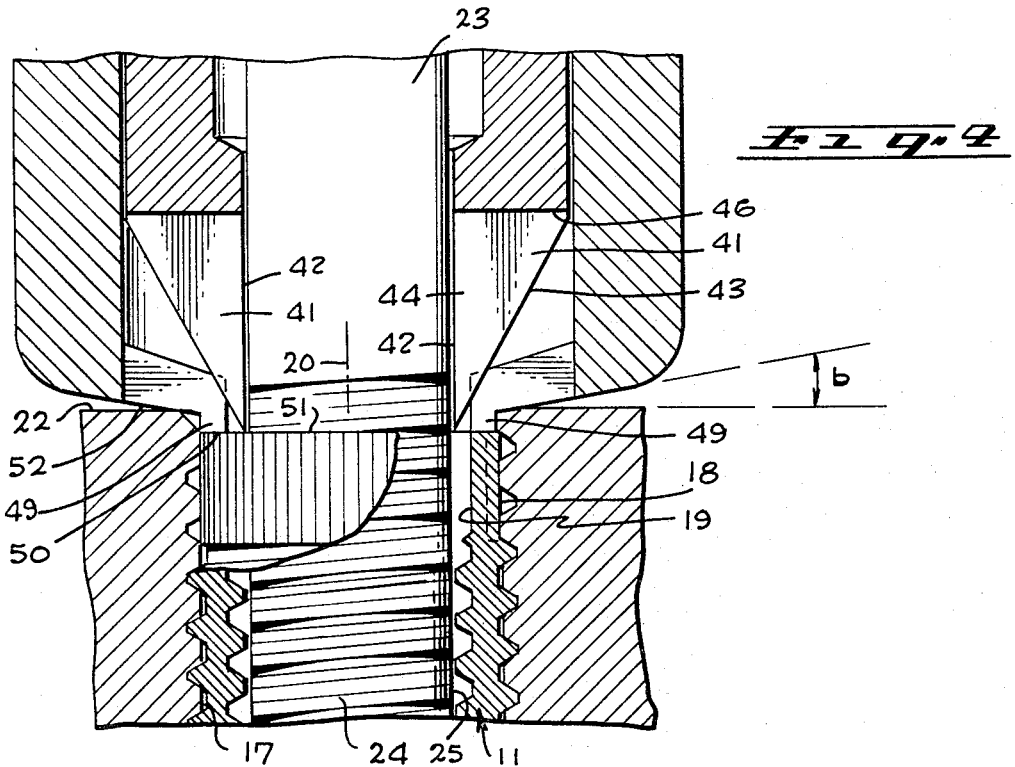
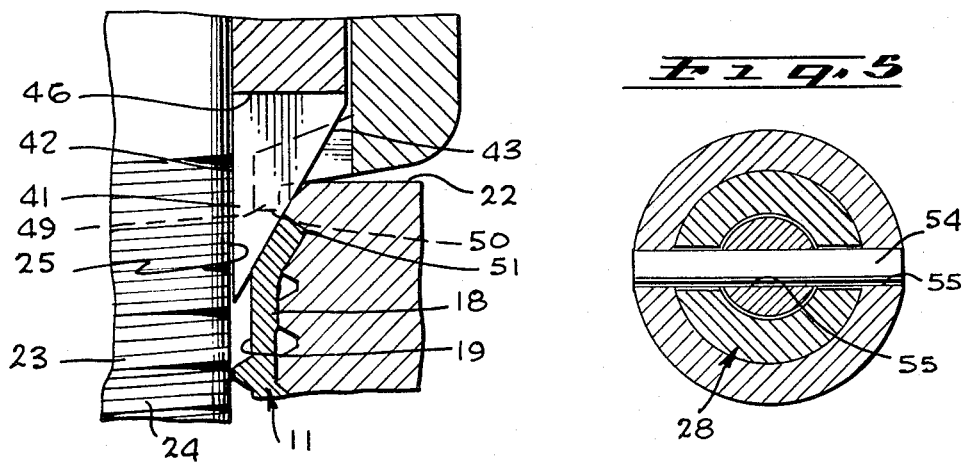
ROBERT NEUSCHOTZ
INVENTOR.
BY William P. Green
ATTORNEY ically spaced serrations 18, which as seen best in FIG. 4

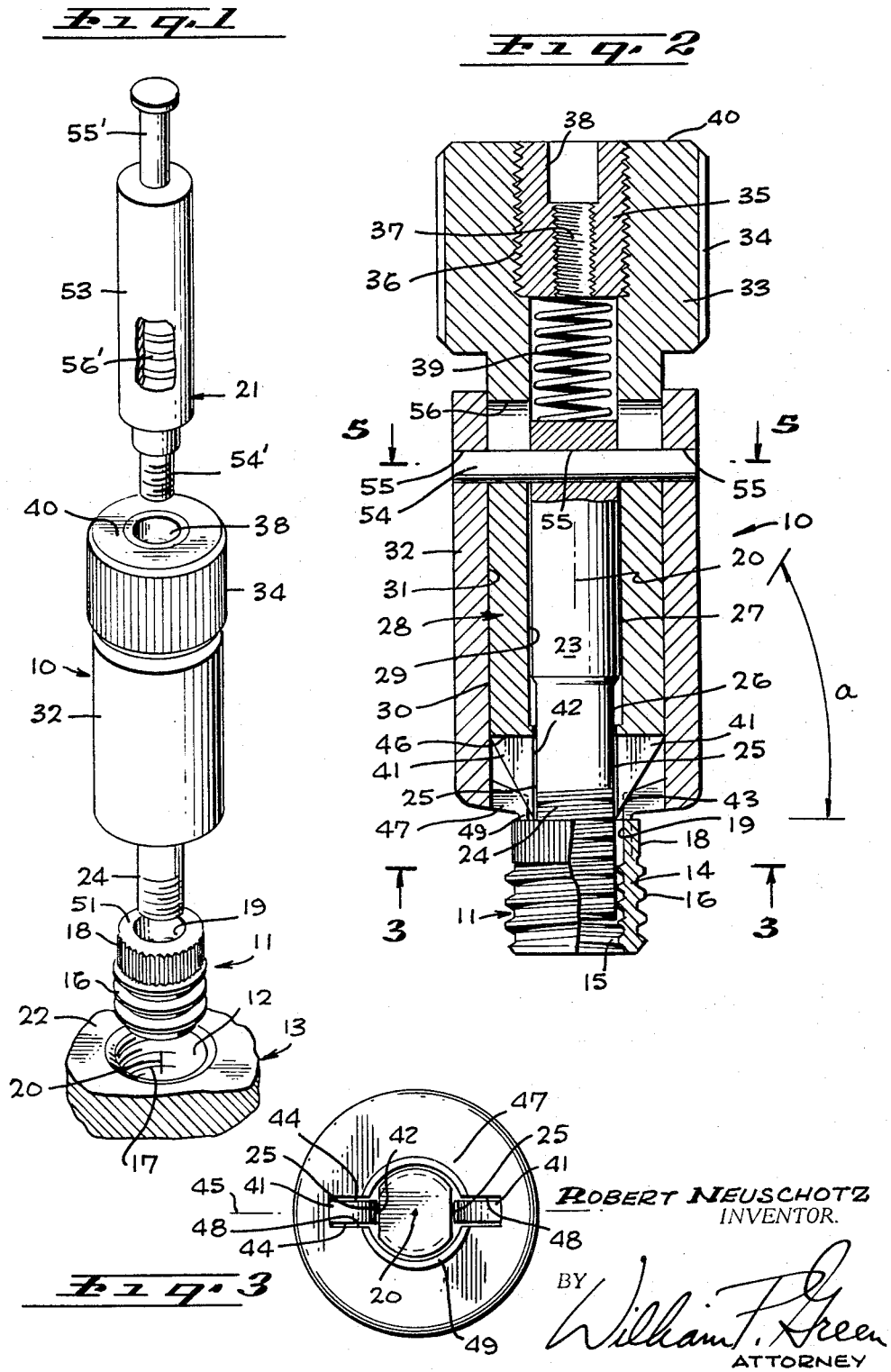

United States Patent Office 3,388,621
Patented June 18, 1968

3,388,621
INSERT INSTALLING AND LOCKING TOOL
Robert Neuschotz, 1162 Angelo Drive,
Beverly Hills, Calif. 90210
Filed Sept. 21, 1965, Ser. No. 489,026
11 Claims. (Cl. 81—3)

ABSTRACT OF THE DISCLOSURE

A tool for installing an internally and externally threaded insert within a carrier part, and including a first section having an end portion with external mounting threads onto which the insert is to be screwed, a second section disposed about the first section and carrying localized projections for deforming a tubular locking portion of the insert locally in a manner locking the insert against unscrewing removal from the carrier part, and an outer tubular part disposed about the second section and connected to the first section for movement therewith, with the outer part carrying two shoulder surfaces or surface areas, one of which engages the insert in a relation limiting the extent to which the insert can be screwed onto the threads of the first section, and the other of which surfaces engages the carrier part in a relation limiting the extent to which the insert can be screwed into the carrier part. The localized deforming shoulders preferably extend radially inwardly at least as far as the major diameter of the mounting threads of the first section, and for best results beyond that major diameter, to engage the locking portion of the insert in a manner deflecting it radially outwardly.

---

This invention relates to improved tools and methods for installing a threaded element within a carrier part, and locking the element against removal from the part. Certain features of the invention have been shown in copending application Ser. No. 405,647, filed Oct. 8, 1964, now Patent No. 3,297,071, inventors Robert Neuschotz and Cullen E. James. The present application is also related to a copending application being filed of even date herewith, entitled "Tool for Installing Threaded Parts, and Related Methods," inventor Robert Neuschotz.

The tools and methods of the invention act to first screw the threaded elements into a carrier part, and then deform a portion of the element, preferably radially outwardly, in a manner locking it against removal. This deformation may be a slight staking operation, for the purpose of preventing the element from being unscrewed from the carrier part as the tool is withdrawn, or the deformation may be in a manner providing a permanent lock of substantial torsional resistance between the parts. Where the lock provided by the present tools and methods is only for the purpose of preventing removal of the threaded element with the tool, it is contemplated that, after removal of the tool, a second deforming operation may be performed to attain a lock of much greater permanent effectiveness, desirably by expanding a locking portion of the element radially outwardly against the carrier part.

A major object of the invention is to provide a combined installing and locking tool of the above discussed type which will automatically and very accurately halt the threaded advancement of the insert or other threaded element into a carrier part, as the element is installed, and at a depth relative to the carrier part which is precisely predeterminable, so that when the element is staked or locked against removal, it will be in exactly the right depth relationship with respect to the carrier part. Preferably, the outer end of the element is spaced a very short distance axially inwardly from the outer surface of the carrier part.

Structurally, the tool embodying the invention may include a first section having a threaded portion which is connectible to the element to be installed, to form a driving connection between these parts by which the tool may screw the element into the carrier part. The tool may also include a second section which is adapted to be driven axially relative to the first section and which drives a localized deforming shoulder into the material of the thread element in a manner performing the desired staking or deforming operation. Desirably, a plurality of such deforming or locking shoulders are provided on the second section of the tool, with a presently preferred form of the invention including two deforming shoulders at diametrically opposite locations. In conjunction with the threaded first section of the device, I provide a stop-shoulder structure which is connected with the threaded first section for movement therewith, and which is engageable with an outer surface of the carrier part in a manner accurately predetermining the depth to which the insert or other element is installed. The deforming shoulder or shoulders then move axially relative to both the element mounting threads and the stop-shoulder during a staking operation. The stop shoulder may carry a lip which projects a short distance axially into the passage in the carrier part into which the element is to be screwed, to preset the element at a location slightly inwardly of the outer surface of the carrier part. The axial driving motion of the deforming shoulders may be resisted by suitable yielding means, such as a spring, carried by the tool.

The above and other features and objects of the invention will be better understood from the following detailed description of the typical embodiment illustrated in the accompanying drawing, in which:

FIG. 1 is an exploded perspective view showing a tool constructed in accordance with the invention, in combination with an insert to be installed by the tool, a carrier part, and an impact applying device;

FIG. 2 is an enlarged axial section through the installing tool of FIG. 1;

FIG. 3 is a transverse section taken on line 3—3 of FIG. 2;

FIG. 4 is a view similar to a portion of FIG. 2, but showing the insert after it has been screwed into the carrier part;

FIG. 5 is a transverse section taken on line 5—5 of FIG. 2;

FIG. 6 is a fragmentary representation of the insert after it has been staked.

Attention is first directed to FIG. 1, which shows a tool embodying the invention at 10. This tool is to be utilized for installing a threaded insert 11 within an opening 12 in a carrier part 13. The insert 11 may be of the type disclosed and covered in my copending application Ser. No. 402,379, filed Oct. 8, 1964, now Patent No. 3,220,454, entitled "Threaded Insert Having Expandable Serrated Locking Portion." More specifically, this insert may have an essentially tubular body 14, having internal threads 15 into which a screw or stud is to be connected after installation of the insert within the carrier part. These internal threads may be of American Standard configuration. Externally, the insert may have threads at 16 which conform to and are adapted to be screwed into internal threads 17 within passage 12 of the carrier part. Axially outwardly beyond threads 16, the body of insert 11 may have a series of axially extending circularly spaced serrations 18, which as seen best in FIG. 4 are of a diameter to be receivable within the minor diameter of carrier part threads 17, so that the insert may be easily screwed into the carrier part to the position of FIG. 4. Within the upper locking portion of the insert which carries serrations 18, the body 14 of the insert may contain a counterbore 19, for engagement by an expansion tool. As will be apparent from FIG. 1, the insert is screwed into the carrier part along an axis represented at 20, about which the various threads and serrations are all centered, and which is also the main axis of tool 10 and an impacting device 21 which is connectible to the tool. The outer surface 22 of the carrier part may be disposed directly transversely of axis 20.

Referring now to FIG. 2, the tool 10 includes a central elongated section 23 which extends along and is centered about an axis 20, and which has at its lower end a series of threads 24 dimensioned to interfit with and screw into internal threads 14 within insert 11. These threads may be selected from the American Standard series, and be centered about axis 20, but be interrupted at two locations by two diametrically opposite parallel "flats" or planar surfaces 25 which extend parallel to axis 20 and are spaced equal distances therefrom, at opposite sides of the axis. Upwardly or axially outwardly of threads 24, the first section 23 of the tool may have an external cylindrical surface 26, also interrupted by the two flats 25, and upwardly beyond which element 23 may have a cylindrical external surface 27.

About section 23, the tool includes a second section 28, which is essentially tubular in shape, having an inner cylindrical surface 29 slidably contacting outer surface 27 of section 23, and having an outer cylindrical surface 30 slidably contacting the inner cylindrical surface 31 of an outer tubular part 32. At its upper end, the tubular side wall of section 28 has a portion 33 of increased external diameter, on the outer surface of which there are formed a series of axially extending circularly spaced knurls or serrations 34 for use in manually gripping and turning section 28. Internally, upper portion 33 of the section 28 contains a tubular insert 35, which threadedly engages portion 33 at 36, and which contains internal threads 37 and an upper counterbore 38. The lower end of part 35 acts as a backing element for a compression coil spring 39, which yieldingly urges the second section 28 upwardly or axially outwardly in a retracting direction relative to section 23, and to the position illustrated in FIG. 2. The upper end surface 40 of section 28 may be disposed directly transversely of axis 20, to be engageable by a hammer or other tool for applying a downward impact against section 28.

At its lower end, section 28 is not circularly continuous, but rather forms two diametrically opposite and identical deforming shoulders or projections 41, which have inner parallel planar surfaces 42 slidably engaging and locating flats 25 of section 23. The radially outer sides of projections or deforming shoulders 41 define tapering inclined deforming or staking surfaces 43, which advance progressively radially inwardly as they advance axially, and which may be planar as shown. In extending radially between surfaces 42 and 43, each projection 41 may form two opposite side surfaces 44, which may be parallel and planar, and which may extend parallel to a radially extending plane 45 (FIG. 3), so that each projection 41 has a cross-sectional shape, transversely of axis 20, which is essentially rectangular as brought out in FIG. 3. This essentially rectangular cross section of the two projections terminates upwardly at the location of a transverse essentially annular shoulder 46 (FIG. 2), upwardly beyond which the section 28 has the previously discussed tubular configuration.

At its lower end, the tubular side wall of the part 32 integrally carries a radially inwardly extending flange portion 47, which is annular except at the location of two diametrically opposite slots or apertures 48 (FIGS. 2 and 3). These slots are shaped rectangularly to exactly receive and confine projections 41, and guide those projections for axial sliding movement within the slots. At its radially inner extremity, flange 47 carries an axially inwardly projecting essentially annular lip 49, which may have an internal diameter approximately equalling the major diameter of threads 24, and which is interrupted only at the locations of the two mentioned slots 48. Lip 49 has an end surface 50 (FIG. 4), which is disposed directly transversely of axis 20 and is engageable with the correspondingly transverse annular end surface 51 of insert 11. Radially outwardly of lip 49, flange 47 has an essentially transverse and essentially annular axially facing surface 52, which is disposed at a very slight inclination to gradually advance axially away from the carrier part as it advances radially outwardly. This surface 52 thus acts as a stop surface for locating the position to which the insert may be driven axially inwardly relative to the carrier part. Preferably, surface 52 is disposed at an angle b (FIG. 4) of between about 3 and 10 degrees to a plane disposed directly transversely of axis 20, and desirably about five degrees.

Outer part 32 is connected rigidly to section 23 for movement therewith by a pin 54 which extends transversely of axis 20 through registering passages 55 in the two connected parts, and is a press fit in those passages. This pin is also received slidably within two axially elongated slots 56 formed in section 28, to transmit rotary motion and forces between section 28 and the two sections or parts 23 and 32.

FIG. 1 represents typically at 21 an automatic impacting device or tool which may be utilized for applying a predetermined accurately controlled driving force downwardly against tool 10. This device 21 is a known type of device, having an outer elongated body 53 which carries at its lower end an externally threaded shank 54' adapted to be screwed into the threads 37 of the tool 10. At its upper end, body 53 of device 21 carries a plunger 55' which is adapted to be pressed downwardly relative to body 53, and which upon such downward motion acts first to compress a spring 56' within body 53, and to then suddenly release the force of the spring in a manner such that it applies a sudden impacting force downwardly against shank 54' and through that shank against section 28 of tool 10.

To now describe the use of tool 10, and the related methods of the invention, in installing insert 11 within carrier part 13, a first step in the method is to screw the insert onto threads 24 at the lower end of section 23 of tool 10, and to the position illustrated in FIG. 2, in which the upper end of the insert engages surface 50 at the end of part 32. Next, the user manipulates the tool to bring the insert into alignment with passage 12 within carrier part 13, and then turns the tool by engagement with knurled portion 34 of section 28, to screw the insert into the carrier part to the position of FIG. 4. The advancement of the insert is limited at the FIG. 4 position by engagement of stop surface or shoulder 52 of the tool with outer surface 22 of the carrier part, with the insert being automatically located a short distance axially inwardly beyond the plane of surface 22. The turning forces applied to knurled surface 34 are transmitted to section 23 and part 32 by means of pin 54.

After the parts have reached the FIG. 4 setting, the user applies a downward force on section 28 of the tool, either by striking upper surface 40 of the tool with a hammer, or actuating the automatic impacting device 21 by depression of plunger 55' to apply a suitable force. This striking force causes section 28 to move downwardly relative to section 23 and its carried part 32, so that surfaces 43 of staking projections 41 engage the upper end of the insert at diametrically opposite locations, and locally deform the wall of the insert at those locations radially outwardly, and in some cases also slightly axially, to the condition illustrated somewhat diagrammatically in FIG. 6. Such driving of localized portions of the insert material against the carrier part serves to effectively stake the insert against removal from the carrier parts as the tool is subsequently turned by knurls 34 in a left-hand unscrewing direction to remove threads 24 from the installed insert.

It is contemplated that after the tool 10 has been removed from the insert, the upper portion of the insert may be further and more completely locked against unscrewing rotation by expanding the portion of the insert which carries serrations 18 radially outwardly against the adjacent turns of carrier part threads 17, and in accordance with the teachings of my previously mentioned application Ser. No. 402,379.

The staking surfaces 43 may be disposed at such an angle as to attain an optimum localized radially outward displacement of the insert wall. It is presently, felt desirable that the inclination of surfaces 43 be such that the angle $a$ between these surfaces and a plane 55 disposed directly transversely of axis 20 (FIG. 2) be between about 55 and 65 degrees, and in certain instances preferably about 60 degrees.

While it is to be understood that in some arrangements embodying certain features of the present tool, particularly for use with large diameter inserts, it may be possible to eliminate the provision on the tool of flats such as those shown at 25 in FIG. 2, these flats in most cases are desirable and serve several significant functions. In the first place, the sliding engagement between these flats and projections 41 assists pin 54 in locating section 23 and preventing its rotation relative to section 28. Secondly, the presence of reduced diameter flats 25 on the threaded stud portion 25 of section 23 enables staking or deforming surfaces 43 to extend well within the internal diameter of the insert. In the third place, this enables the formation of staking projections 41 in a manner increasing their radial thickness beyond the thickness which would be possible if flats 25 were not provided, to thereby attain increased strength in these projections, which increased strength is especially important in tools for driving very small inserts, in which case the dimensions of the projections are at best very small.

I claim:

1. A tool for installing in a carrier part an essentially tubular element having external first threads for engaging said carrier part and having internal second threads for engaging another member, comprising a first tool section having external mounting threads engageable with said second threads to connect the tool to the element so that the tool may screw the element into said carrier part, said first section having cutaway portions at circularly spaced locations at which said mounting threads are at least partially interrupted, an essentially tubular second section mounted about said first section and adapted to be driven axially relative thereto, circularly spaced projections on said second section movable therewith and received adjacent said cutaway portions and positioned to engage and locally deform circularly spaced portions of said element, upon said axial movement, in a relation locking the element against removal from the carrier part with the tool, an essentially tubular third section disposed about said first and second sections and connected to said first section for movement therewith and carrying an essentially transverse and essentially annular stop shoulder at its axially inner end about said first section for engaging said carrier part and limiting axially inward movement of the element, said stop shoulder containing angularly spaced apertures slidably receiving and passing said projections.

2. A tool for installing in a carrier part an essentially tubular element having external first threads disposed about an axis for engaging said carrier part and having internal second threads for engaging another member, comprising a first tool section having external mounting threads engageable with said second threads to connect the tool to the element so that the tool may screw the element into said carrier part, said first section having cutaway portions at circularly spaced locations at which said mounting threads are at least partially interrupted, a second section mounted about said first section and adapted to be driven axially relative thereto, circularly spaced projections on said second section movable therewith and received adjacent said cutaway portions and positioned to engage and locally deform circularly spaced portions of said element, upon said axial movement, in a relation locking the element against removal from the carrier part with the tool, a third section disposed about said first and second sections and connected to said first section for movement therewith and carrying an essentially transverse and essentially annular stop shoulder at its axially inner end about said first section for engaging said carrier part and limiting axially inward movement of the element, said stop shoulder containing angularly spaced apertures slidably receiving and passing said projections, said projections having surfaces for engaging said element and which taper toward said axis to locally deform said element radially outwardly, a spring yieldingly resisting said axial movement of said second section relative to said first and third sections, and a pin rigidly connecting said first and third sections together and extending through a slit in said second section in rotary keying relation.

3. A tool for installing in a carrier part an element having first threads for engaging said carrier part and having second threads for engaging another member, comprising a first tool section having mounting threads engageable with said second threads to connect the tool to the element so that the tool may screw the element into said carrier part, a second tool section adapted to be driven along an axis relative to said first section, while said mounting threads are connected to said second threads, and means forming a localized deforming shoulder which is located at a side of said axis and is not circularly continuous thereabout and is movable axially with said second section relative to said mounting threads and is positioned to engage and locally deform a portion of the element in a relation locking the element against removal from the carrier part with the tool, said mounting threads on said first section being at least partially interrupted at the location of said deforming shoulder in a relation forming an axially extending flat on the first section at said location, and said shoulder being received closely adjacent and being slidable axially along said flat on said first section at said location at which the threads are interrupted.

4. A tool for installing in a carrier part an element having first threads for engaging said carrier part and having second threads for engaging another member, comprising a first tool section having mounting threads engageable with said second threads to connect the tool to the element so that the tool may screw the element into said carrier part, a second tool section adapted to be driven along an axis relative to said first section, while said mounting threads are connected to said second threads, and means forming two localized deforming shoulders which are located at diametrically opposite sides of said axis and are not circularly continuous thereabout and are movable axially with said second section relative to said mounting threads and are positioned to engage and locally deform two portions of the element in a relation locking the element against removal from the carrier part with the tool, said mounting threads on said first section being at least partially interrupted adjacent both of said shoulders in a relation forming two diametrically opposite flats, said shoulders being received closely adjacent and being slidable axially along said flats and being tapered toward said axis to deform the material of said element radially outwardly.

5. A tool for installing in a carrier part an essentially tubular insert having external first threads for engaging said carrier part and having internal second threads for engaging another member, comprising a first tool section extending along an axis and having an end portion with external mounting threads extending generally about said axis and engageable with said internal threads of the insert to connect the tool to the insert so that the tool may screw the insert into said carrier part, a first shoulder surface area engageable with said insert in a relation limiting the extent to which the insert may be screwed onto said first section, an additional shoulder surface area movable with said first section and engageable with the carrier part to limit the extent to which said first section may screw said insert into the carrier part, an essentially tubular second section extending about said first section and movable axially relative thereto, said essentially tubular second section having at least one localized projection which is located at a side of said axis and is not circularly continuous thereabout, and is positioned to engage and deform a portion of the insert upon said axial movement of the second section relative to said first section, in a relation locking the insert against removal from the carrier part.

6. A tool is recited in claim 5, in which said projection extends radially inwardly toward said axis beyond the major diameter of said mounting threads.

7. A tool is recited in claim 5, including an essentially tubular outer part disposed about said essentially tubular second section and connected to said first section and carrying both of said shoulder surface areas.

8. A tool as recited in claim 5, including an essentially tubular outer part disposed about said essentially tubular second section and connected to said first section and having a radially inwardly extending flange at its axially inner end forming said two shoulder surface areas.

9. A tool as recited in claim 8, in which said radially inwardly extending flange contains a slot through which said projection movably extends.

10. A tool as recited in claim 5, in which said first section has a flat at said side of the axis extending radially inwardly farther than the major diameter of said mounting threads, said projection having a portion positioned adjacent and movable along said flat and also extending radially inwardly farther than said major diameter of said mounting threads.

11. A tool as recited in claim 5, in which said second section has a plurality of said localized projections at different sides thereof and each having a radially outer camming surface for engaging and deforming the insert, said camming surfaces being disposed angularly to advance radially inwardly as they advance axially toward the end of said first section at which said external mounting threads are formed and to thereby cam the wall of said insert radially outwardly, said first section having a plurality of flats at the locations of said projections extending radially inwardly beyond the major diameter of said mounting threads, said localized projections also extending radially inwardly beyond said major diameter of the mounting threads adjacent said flats, there being an essentially tubular outer part disposed about said second section and connected to said first section and having a radially inwardly extending flange at its axially inner end forming said two shoulder surface areas, said flange containing a plurality of localized slots through which said projections extend movably, and means yieldingly resisting movement of said second section axially relative to said first section toward the end on which said mounting threads are formed.

References Cited
UNITED STATES PATENTS

| | | | |
|---|---|---|---|
| 220,996 | 10/1879 | Singer | 29—432 X |
| 2,438,744 | 3/1948 | Flynn | 81—10 |
| 2,550,866 | 5/1951 | Rosan | 81—53 |
| 2,637,232 | 5/1953 | McKean | 81—53 |
| 3,091,842 | 6/1963 | Creamer | 29—432 |
| 2,229,571 | 1/1941 | Johnson | 29—270 X |

OTHELL M. SIMPSON, *Primary Examiner.*

W. FELDMAN, *Examiner.*

J. C. PETERS, *Assistant Examiner.*